United States Patent [19]

Frerk

[11] Patent Number: 4,793,576

[45] Date of Patent: Dec. 27, 1988

[54] OPERATING THE CONTROL SURFACES IN AIRCRAFT

[75] Inventor: Karl Frerk, Delmenhorst, Fed. Rep. of Germany

[73] Assignee: VFW GmbH, Bremen, Fed. Rep. of Germany

[21] Appl. No.: 451,828

[22] Filed: Dec. 21, 1982

[30] Foreign Application Priority Data

Dec. 28, 1981 [DE] Fed. Rep. of Germany ....... 3151623

[51] Int. Cl.[4] ...................... B64C 13/04; B64C 13/50
[52] U.S. Cl. .................................. 244/228; 244/75 R
[58] Field of Search .................. 244/75 R, 76 R, 221, 244/226, 227, 228, 236, 87, 213

[56] References Cited

U.S. PATENT DOCUMENTS

| | | | |
|---|---|---|---|
| 2,595,192 | 4/1952 | Garby | 244/87 |
| 2,971,726 | 2/1961 | Bratt et al. | 244/76 R |
| 3,473,760 | 10/1969 | Vaiden | 244/236 |
| 3,592,418 | 7/1971 | Wood | 244/226 |
| 3,949,958 | 4/1976 | Richter | 244/227 |
| 4,004,537 | 1/1977 | Nilsson | 244/236 |

FOREIGN PATENT DOCUMENTS 945974 7/1956 Fed. Rep. of Germany .... 244/75 R

*Primary Examiner*—Galen Barefoot
*Attorney, Agent, or Firm*—Ralf H. Siegemund

[57] ABSTRACT

Control surfaces in an aircraft are biparted, and one portion is acted upon by a mechanical signal transmission system in a redundant manner, the other one by an electrical signal transmission system normally operating in parallel; different construction versions and embodiments are described.

8 Claims, 2 Drawing Sheets

OPERATING THE CONTROL SURFACES IN AIRCRAFT

BACKGROUND OF THE INVENTION

The present invention relates to an apparatus for operating control surfaces in an aircraft.

Aircrafts are usually equipped with mechanical transmission system or systems for adjusting the position of the several control surfaces. These mechanical signal transmission systems, particularly for example for adjusting the elevators providing correspondingly the elevational control for the aircraft, are preferred but only if in the case of manual control a supplemental utilization of electrical or other control signals are not needed. Also it was found that the mechanical operation of control surfaces is more economical as well as safer than an analogous electrical system.

Independently from the foregoing, electrical signal transmission paths between, utimately, the pilot and the control surfaces have been used in lieu of mechanical control systems. These electrical control systems are known generally or have been designated generally by the term "fly by wire" systems. A fly by wire system is preferred in those cases in which independently developed controlled signals are to be superimposed upon the commands provided by the pilot. For this reason electrical control systems in general including transmission systems of an electrical nature linking the pilot with the control surfaces are deemed to be attractive. Nevertheless, inspite of these advantages, electrical control signals have not been used extensively in commercial aircraft and the reason here is the belief that these electrical control systems are less reliable than mechanical control systems. Of course, the reliability of an electrical control system can be enhanced through redundancy but clearly the concept of redundancy is inherently an uneconomical one.

DESCRIPTION OF THE INVENTION

It is an object of the present invention to provide a new and improved control and actuating system for the control surfaces in aircrafts in which the advantages of an electrical system and the advantages of a mechanical system are combined without penalty as to economics.

In accordance with the preferred embodiment of the present invention, it is suggested to divide each control surface which by its nature is provided for performing a uniform or unitary function, into two portions and to control one of the portions by means of an electrical signal transmission system and to control the other one by means of a mechanical transmission system. The term transmission system is to be understood to designate an operative linkage between a pilot and the control surfaces.

It was found that the inventive concept results in a control and actuating system which from an overall point of view is as reliable as a mechanical signal transmission can be and still the concept of signal superimposing which is available in an electrical system can be practiced so that the pilot command can be manipulated and augmented in the requisite manner. Therefore, the electrical signal transmission system should have a point in which control signals such as autopilot signals, stabilizing signals and other aircraft control signals are combined with a pilot initiated signal.

The particular control surfaces in question, being by their nature of a uniform construction and of uniform function are preferably subdivided into equally large control surfaces the line of partition running transversely to the pivot axis. Each subsurface is associated with and connected to the appropriate control and actuating members. The partitioning into two equally large control surfaces is of course a matter of first approach. In a more sophisticated manner it was found to be advisable to utilize differently large surfaces whereby, the larger subsurface is connected to the mechanical signal transmission system and the smaller one is connected to and operated by the electrical signal transmission system which in this case basically receives stabilizing signals resulting from an automatic control feature.

In accordance with another aspect of the invention, a control surface may be constructed as a rudder with a flap arranged at the tip; the rudder is associated with and actuated by the mechanical signal transmission system and the smaller flap is under control of the electrical signal transmission system.

From a general point of view, it should be mentioned that the electrical transmission path system and circuit can be strictly an analog circuit, but it may also include a digital section. The two subsurfaces in each instance are controlled basically in unison, but the control augumentation in the electrical transmission path may cause the desired deviation from the pilot initiated command.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings. FIG. 1 illustrates the elevational control for a commercial aircraft. The elevational control consists of two elevators 1 and 2, each of which being in fact biparted into two at least approximately similar subsurfaces such as 1' and 1" for the left hand elevator 1 and the surfaces 2' and 2" for the right hand elevator 2. Reference numeral 3 and 3a respectively refer to the pivot axis for the two elevators, and the line of partitioning runs transversely to the respective axis. These elevators and elevator subsurfaces are controlled by means of mannual control sticks or columns 4 and 4' which can be actuated individually and in unison under utilization of connecting rods 5 and 6 being interconnected by means of an overcontrolled coupling 7. The connection 6, in addition, is connected to a device 8 for simulating a control force to be effective in the case of autopilot control to be described below.

Figure 1:
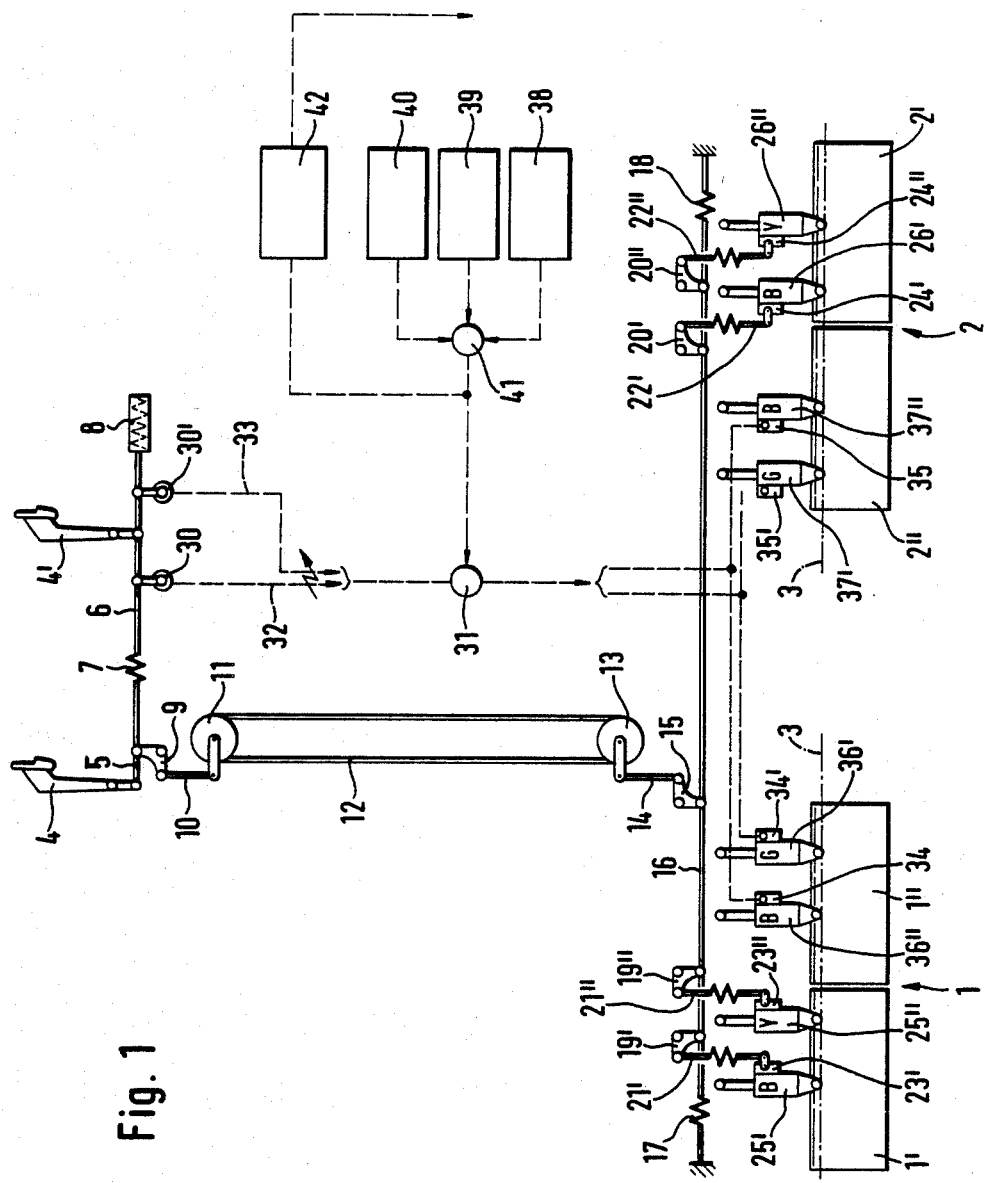
FIG. 1 is a somewhat schematic drawing showing the control system for the elevational control of an aircraft in accordance with the preferred embodiment of the present invention.

The control signal, i.e. the manual control signals as set up by either or both of the control sticks or columns 4 and 4' are transmitted to the elevator by a mechanical signal transmission system operating in parallel with an electrical signal transmission system, these two systems operate in parallel as follows: The mechanical signal transmission system uses as an immediate input the displacement and deflection undergone by the connection 5. An angle lever 9 pivotally links the rod 5 to a thrust rod 10 so that the horizontal movement of the rod 5 is converted into a vertical displacement, in this case by the thrust rod 10.

The displacement of thrust rod 10 is transmitted to a sheave 11 looped around by the endless belt 12; the loop is completed through a second sheave 13. The sheave 13 is connected to a lever which acts upon a thrust rod 14 which in turn is pivotally linked to an angle lever 15 for actuation of a rather long rod 16. Therefore, one can see that the mechanical transmission as described thus far transmits the horizontal movement of the control rod 5, as a horizontal movement of a control and actuating rod 16 being laterally displaced from the rod 5, but operating in a parallel fashion. This particular mode of linkage and connection is shown by way of example only and is used here to demonstrate the transmission of mechanical motion. There may be additional directional changes interposed, in which case the appropriate levers, sheaves, pulleys or the like, are to be used.

The control and actuation rod 16 is centered to the fuselage frame and support structure of the aircraft by means of centering springs 17 and 18. Rod 16 is held in a particular central position by these springs until and unless actuated upon by the mechanical transmission system and here particularly by a movement of the angle lever 15. Angle levers 19', 19", 20' and 20" transmit the displacement of the actuation rod 16 to a plurality of hydraulic actuating element; these actuating elements are control valves 23', 23", 24' and 24" in this example. The control valves in turn operate hydraulic actuators 25', 25", 26' and 26" respectively, whereby in particular, the two hydraulic actuators 25' and 25" both act upon the control surface 1' being one half of the elevator 1, while the control elements and hydraulic actuators 26' and 26" are connected to and act upon the control surface 2' being one half of the elevator 2. It can thus be seen that the immediate actuation of the control surfaces 1' and 2' is carried out in a two-fold redundancy which means that in the case one of the hydraulics fails the respective other one is still capable of acting upon the respective control surface.

As mentioned above, parallel to the mechanical transmission system there is an electrical transmission system which is likewise acted upon by the control sticks or columns 4 and 4'. The electrical system operates abinitio with two fold redundancy. For this purpose, two electrical transducers 30 and 30' are connected to the rod 6. The two transducers 30 and 30' provide independently output signals which are fed through separate lines 32 and 33 to a signal summing network 31 constituting two summing points. Independently from the additional inputs provided to the summing point network, the summing points 31 provide two outputs which are fed to electrically operated valves 34, 34', 35 and 35'. It can thus be seen, that the electrically operated control valves 34 and 35 receive control signals from one of the two-fold redundant electrical signal transmission paths whereas the control valves 34' and 35' receive signals from the other signal path. The several control valves respectively control hydraulic actuator 36', 36", 37' and 37" and these hydraulic actuators are connected to the control surfaces 1" and 2" as illustrated for two-fold redundantly controlling each of these control surfaces constituting respectively the other half of the elevators 1 and 2.

The electrical transmission system permits the superimposing of electrical control signals upon the transducer signals as they are directly derived from the control sticks or steering columns. These supplemental control signals are fed (in duplicate) to the summing point network 31. It may be assumed that in fact, a plurality of signal sources are provided to be superimposed upon the manual control signals as reflected in the electrical transmission path. First of all, there is a flight controller 38, next, an autopilot 39 is provided and some other control system 40 is provided which may be a piece of optional equipment for example a stabilizing control. Each of these units is known per se and provides output signal tube combined in a summing point 41, the output of which serving as alternative input to the two-fold summing point 31. The output of the summing stage 41 may additionally be fed to a trim logic 41 which in turn controls trimming for purposes of trimming the horizontal disposition and attitude.

The hydraulic actuators as illustrated, are labeled additionally by the letter B, G and Y. These letters indicate that the several hydraulic actuators, as far as their supply with hydraulic fluid is concerned, are connected to three different sources of hydraulic fluid to obtain also here a safety redundancy feature. It is important that the two hydraulic actuators connected to the same control surface do not receive hydraulic fluid from the same source, moreover one can see that the association is such that even if two sources of hydraulic fluid drop out, the remaining one renders operational at least one of the two control subsurfaces on each side.

The various aspects of redundancy illustrated in FIG. 1 are by way of example only and could well be enlarged. Critical for the invention is the parallel operation, but also being an independent one, of the two signal transmission systems, one being a mechanical one the other one being an electrical one. These systems operate normally in parallel, i.e. simultaneously and upon proper adjustment, the biparted control surfaces in each instance are acted upon by the transmissions in exactly the same manner. The design of the adjusting elements and control actuators depends to a considerable extent on boundary conditions which are aircraft specific and are determined, for example, by conditions causing fluttering, or by conditions having to do with the hydraulic supply, with the loads on the control surfaces in the case of asymmetric actuation and deflection of control surfaces, conditions of controlability generally and in those cases in which one or the other element drops out. In connection therewith, it should also be mentioned that in dependence upon the respective control function it may be advisable and even desirable to feed the electrical output signal (41) to a trimming stage as illustrated in order to trigger a deflection of trim surfaces particularly in the case of large and persistant actuation signals. This way one obtains somewhat a retraction in the formation of the control signal so that the position of the electrically controlled subsurfaces can in fact deviate from the disposition of the mechanically controlled surface only within a very small specific signal band.

Figure 2:
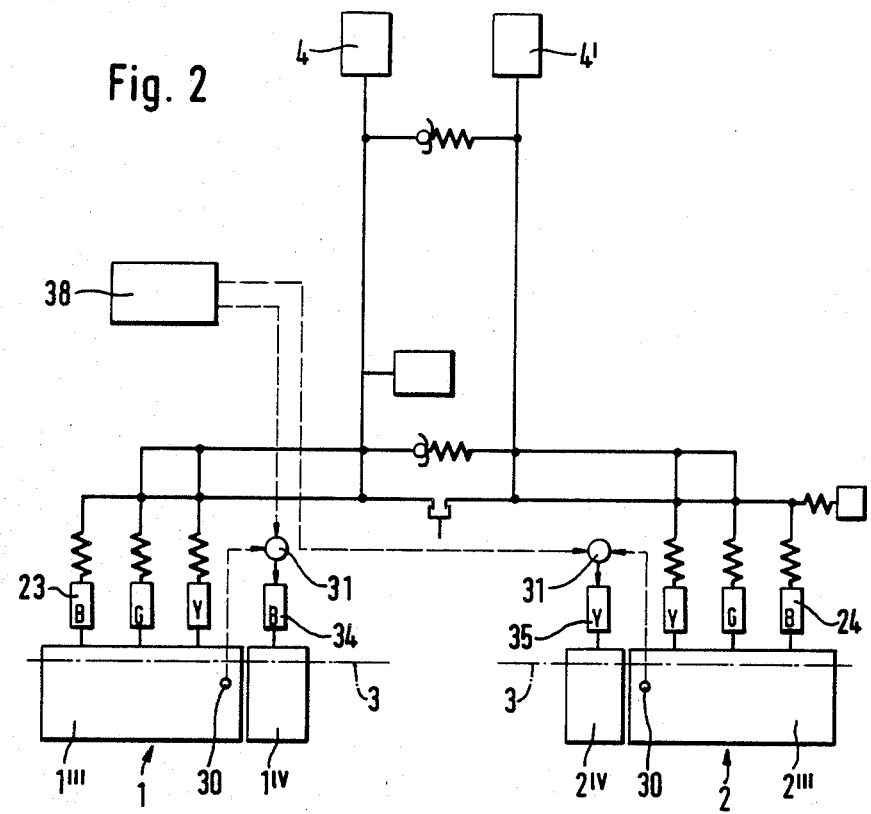
FIG. 2 illustrates a modification skill constituting the preferred embodiment for practicing the best mode of the invention.

FIG. 2 illustrates a modification of the apparatus as disclosed in FIG. 1 and involves particularly a modified elevator control system for an aircraft. This particular example, illustrated that the elevators 1 and 2 are subdivided into two unequal control surfaces 1''', 1'$^v$, 2''' and $2'^v$. In this case, $1'''$ and $2'''$ constitutes the larger ones of the two control surfaces in each instant and they will be controlled by the steering columns 4 and 4'. The mechanical control system is stabilized, there being control sticks or columns 4 and 4' as usual, and a solid line pattern illustrates a mechanical linkage of these control columns with two hydraulic systems 23 and 24 each consisting of three hydraulic actuators.

In additional, an electrical signal transmission system is provided indicated here in lines accompanied by a dashed line in each instance. There is provided a flight controller system 38 feeding outputs to summing point 31a and 31b which in turn provide outputs to dual hydrualic actuators 34a and 35a. These hydraulic actuators are connected to and operate the two control surfaces $1'^v$ and $2'^v$. The two last mentioned, relatively small control surfaces establish only a relatively small control effect and, therefore, will not dominate the control operation. The basic control is provided by the mechanical system as acting upon the larger control surfaces $1'''$ and $2'''$.

The electrical system, however includes an addition transducers 30a and 30b which are respectively coupled to the control surfaces $1'''$ and $2'''$ and they provide outputs to serve as second inputs for the two summing points 31a and 31b. This way one establishes a follower control in that the control surfaces $1'^v$ and $2'^v$ follow any deflection which the surface $1'''$ and $2'''$ undergo. The control surfaces $1'^v$ and $2'^v$ are as stated of lower effectiveness and for this reason a redundancy in their control is not provided for.

This particular example suffices in those cases in which the stability requirements and the circumstances for establishing stability are not particularly critical. Also, this principle can be used in the case of reduced longitudinal stability.

Figure 3:
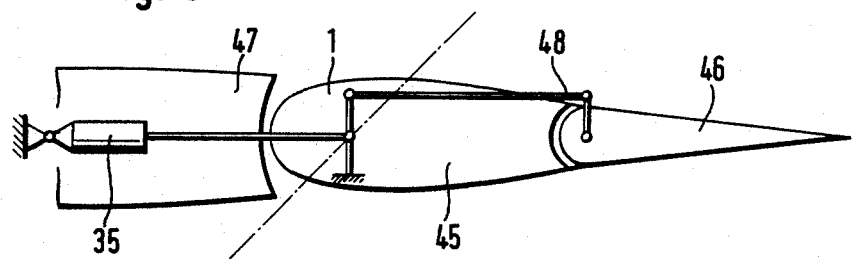
FIG. 3 is a section view through an elevational control with rudder and flap in an aircraft.

As shown in FIG. 3, the inventive principle is applicable also in a different situation and here particularly in the case of a rudder. The rudder 45 in this case is provided with an end flap 46. It can be seen that in this case the partitioning is taken along the direction of the pivot axis of the rudder which of course extends perpendicularly to the plane of the drawing. However, a partitioning as illustrated and described above and taken transversely to the pivot axis of a control surface, can also be provided for in the case of a rudder. The hydraulic actuator for the rudder, denoted by reference number 135 in this case is disposed in the trim fin 47 and linked to the rudder 45 in an appropriate manner. The flap 46 should be actuated independently by means of an electrical transmission system. In order to make sure that rudder and flap deflections remain independently from each other, the flap drive links the electrical actuation with the flap by means of a lever 48.

The invention is not limited to the embodiments described above, but all changes and modifications thereof, not constituting departures from the spirit and scope of the invention, are intended to be included.

I claim:

1. Apparatus for operating control surfaces in an aircraft, comprising:

control surface means constructed to be established by biparted control surfaces in which each portion of a biparted control surface is to undergo normally the same deflection as the respective other one so that a biparted control surface as such may undergo a particular deflection reflected by similar deflections of its two parts;

control means including at least one steering column, said control means upon deflection of the steering column providing a first output in the form of a mechanical displacement and a second output in the form of an electrical signal;

mechanical signal transmission means coupling said mechanical displacement to the control surfaces, said surfaces in each instance being and including one part of the biparted control surfaces;

electrical signal transmission means coupling said electrical signal as a displacement actuation to the other parts; and wherein the mechanical signal transmission operates independent from the electrical transmission and vice versa, so that the one part of the biparted control surface is adjusted independently from the electrical transmission means and the other part being adjusted independently from the mechanical transmission means.

2. Apparatus as in claim 1 wherein the electrical signal transmission includes a signal summing point means and means for feeding additional control signal to said signal summing point means.

3. Apparatus as in claim 2 wherein in said additional signals are provided by at least one of the following, an autopilot, a flight controller and a stabilizing system.

4. Apparatus as in claim 1 wherein said control surfaces are biparted in two control surface parts of at least approximately similar size, a line of partition in each instance extending transversely to the pivot axis of the control surfaces.

5. Apparatus as in claim 1 wherein a plurality of similar actuators are used in each of the transmission paths for immediate actuation of the parts of the control surfaces in order to obtain redundancy in the actuation.

6. Apparatus as in claim 1 wherein said control surfaces are biparted in two surfaces of different size, the line of partition extending transversely to the pivot axis of the respective control surfaces, and wherein the respective larger control surfaces are coupled to the mechanical transmission system in a redundant manner and the smaller control surfaces are coupled to and associated with the electrical system.

7. Apparatus as in claim 6 wherein transducers are provided on the larger ones of the biparted control surfaces, the output of the transducers being superimposed upon signals provided in the electrical signal transmission path.

8. Apparatus as in claim 1 as applied to a rudder having a rudder proper and a flap, the rudder proper being connected the mechanical transmission system, the flap being connected to an operate by the electrical transmission system.

* * * * *